United States Patent [19]

Blunt et al.

[11] 3,966,653

[45] June 29, 1976

[54] CELLULAR MATERIAL

[75] Inventors: Geoffrey Vincent Dallow Blunt, Cheltenham; Newton John Hodges, Charlton Kings, both of England

[73] Assignee: Coal Industry (Patents) Limited, London, England

[22] Filed: Dec. 1, 1972

[21] Appl. No.: 311,318

[30] Foreign Application Priority Data
Dec. 20, 1971  United Kingdom............... 58987/71
Apr. 6, 1972   United Kingdom............... 15941/72
Sept. 1, 1972  United Kingdom............... 40545/72

[52] U.S. Cl............................ 260/2.5 EP; 260/2 N; 260/2 EP; 260/28 R; 260/2.5 S; 260/47 EP; 260/47 EA; 260/47 EN; 260/824 EP; 260/827

[51] Int. Cl.²..................... C08J 9/00; C08L 63/00; C08L 95/00

[58] Field of Search......................... 260/2.5 EP, 28

[56] References Cited
UNITED STATES PATENTS

| | | |
|---|---|---|
| 2,739,134 | 3/1956 | Parry et al. ................... 260/2.5 EP |
| 3,051,665 | 8/1962 | Wismer et al. ................. 260/2.5 EP |
| 3,251,786 | 5/1966 | Edmonds ....................... 260/2.5 EP |
| 3,385,802 | 5/1968 | Trieschock .................... 260/2.5 N |
| 3,420,794 | 1/1969 | May et al. ..................... 260/2.5 EP |
| 3,749,688 | 7/1973 | Mihelic ......................... 260/2.5 N |
| 3,772,231 | 11/1973 | Enomoto et al. ................ 260/28 |

FOREIGN PATENTS OR APPLICATIONS 919,779   2/1967   United Kingdom............ 260/2.5 EP

*Primary Examiner*—Wilbert J. Briggs, Sr,
*Attorney, Agent, or Firm*—James C. Wray

[57] ABSTRACT

Cellular materials based on epoxy resins are known but are difficult to manufacture because of high exotherm. The addition of coal pitch which may be coal tar pitch or coal digest mitigates this to an extent not related to the heat capacity of the coal pitch. Cellular materials having fine even cells can easily be made. Certain epoxy resins enable flexible cellular materials to be manufactured.

40 Claims, No Drawings

CELLULAR MATERIAL

This invention relates to cellular materials. In particular it relates to cellular materials based on epoxy resins, particularly of medium or low densities.

It has been proposed to manufacture cellular materials employing, as the solid phase thereof, epoxy resins. These are in principle formed by foaming a mixture of an epoxide and a curing agent therefor and curing the cellular mixture so formed. The cellular materials hitherto manufactured based on epoxy resins have not proved economically viable except in special cases. In the manufacture of cellular materials in general, a major consideration is the formation of cells that are both small and of uniform size. These two criteria are of importance in relation to both thermal insulation and strength properties. It has proved difficult to manufacture cellular materials, based on epoxy resins, having a small, uniform cell size except with exceptional skill being employed.

It is well known in the art of the manufacture of cellular materials that it is essential to set the foamed material rapidly so that the cells do not coalesce or dissipate. It is therefore essential to ensure that the reaction conditions are such that the reaction does not get out of control. In the case of an epoxy resin based cellular material, the epoxy resin material is set by the reaction of the epoxide with the curing agent. Unfortunately the reaction of an epoxide with a curing agent is exothermic. The amount of heat produced is often so high, in practice, to produce scorching of the resin or an uneven cell structure or both, particularly when a cellular material of relatively low surface area to volume ratio is manufactured.

It has been proposed in general for epoxy resins to employ modifying agents or other additive, for example toluene, which, by virtue of their latent heat of evaporation, mitigate the exothermic nature of the reaction. This is not entirely satisfactory for cellular materials as the volatilization of the toluene will affect the cell structure, particularly favouring relatively large cells.

One possibility would be to employ a relatively slow curing system of epoxide and curing agent. This is often used for relatively large epoxy resin castings so that the heat can dissipate slowly. It is not entirely suitable for use in the manufacture of cellular materials since the cells would tend to dissipate or coalesce before curing had finished.

Certain organosiloxanes have been proposed to act both as the curing agent for the epoxide and as the blowing agent. Their disadvantage lies in their relatively slow reaction at least at temperatures below about 50°C. If the temperature is above about 50°C. the reaction may be more rapid, but the aforementioned disadvantages resulting from the exothermic reaction occur.

Epoxy resins are relatively expensive plastics materials. Unless there is an exceptional requirement, the high cost of the epoxy resin may make their use uneconomical. Those of skill in the art have not been able satisfactorily to manufacture cellular materials based on epoxy resins at a comparable cost with those based on other plastics materials, and have believed that this was not possible. This invention enables cellular materials based on epoxy resins having excellent cell structure, the cells being both uniform and small, to be manufactured. The exothermic nature of the epoxide curing reaction appears surprisingly to be mitigated so that no exceptional skill in cellular material technology is needed in the manufacture of the cellular materials. The cellular materials can have a much lower cost than those hitherto available based on epoxy resins, while still retaining surprisingly good strength properties. The cellular materials need no special equipment and can often be foamed and cured in under five minutes, both features in contrast to those cellular materials hitherto manufactured based on epoxy resins.

Accordingly, the invention provides a cellular plastics material consisting essentially of between 5% and 80%, preferably between 10% and 40%, of coal pitch, as hereinafter defined, and an epoxy resin and including at least 25% by volume, and preferably at least 60% by volume, of cells.

The invention further includes a foamable two-part system for such a cellular plastic material consisting essentially of an epoxide, a curing agent therefor, and between 5% and 80% of coal pitch, as hereinafter defined, and a foaming or blowing agent, one of the parts containing the epoxide and the other part containing the curing agent. Advantageously the coal pitch is in admixture with the curing agent.

The invention further comprises concurrently foaming a foamable plastics composition containing an epoxide, a curing agent therefor, between 5% and 80% of coal pitch, as hereinafter defined and a foaming agent and curing the epoxide with the curing agent.

By "coal pitch" is meant coal tar pitch, that is the residue from the fractional distillation of the coal tar produced by the destructive distillation of coal, and that product known herein as coal digest and formed by the dissolution of coal in pitch, tar, tar oils or other solvent therefor at an elevated temperature, for example 300°C to 450°C, whereby the coal, or as much thereof as is practical to dissolve, is dissolved in the pitch, tar, oil or other solvent. The coal is not present as a discrete phase, as is the case when the coal is suspended in the pitch, tar, oil or other solvent, but is present in solution either as itself, or in a solvolysed form.

It has been suggested that a coal digest may comprise a two phase system including the pitch, tar, oil, or other solvent in which partially solvolysed coal is suspended. Insofar as the present invention is concerned, such a suspension is a permanent one and the coal digest may be considered as a single phase system. It is believed that the coal digest may be partly colloidal.

There will be a certain proportion of the coal, mostly ash, which will be insoluble in the pitch, tar, oil or other solvent. This proportion may be filtered off.

The properties of the coal digest may be varied by varying the coal, the pitch, tar, oil or other solvent employed, the relative quantities thereof and other conditions, particularly temperature, of its formation.

It may be convenient, particularly if a flexible cellular material is to be produced, to employ an oil-extended coal digest having a needle penetration index, converted to a Ring and Ball softening point of 85°C, of at least 10, and preferably at least 15.

A relatively high needle pentration index of the coal digest may often be preferred, in principle. However, it has been found that coal digests having needle penetration indices of above 25, converted to a softening point of 85°, are difficult to manufacture. A needle penetration index of up to about 45, converted to a softening point of 85°C, may often be particularly suitable.

The needle penetration index of a material is that distance that a standard needle penetrates vertically into a sample of the material under fixed conditions of loading, time and temperature. The method used herein is that of Institute of Petroleum Standard method of testing IP 49/67, which is believed not significantly to differ from the A.S.T.M. D5 method. In this method the needle penetration index is that distance, measured in tenths of a millimeter, that the standard needle penetrates into the sample when applied thereto for 5 seconds by means of a penetrometer under a load of 100g and at 25°C.

The extension of the coal digest with oil or tar will involve the variation of both the softening point and the index of the coal digest. Accordingly, the needle penetration index specified for the purposes of this invention must be taken with reference to a particular softening point of coal digest, 85°C. In respect of coal digest having softening points other than 85°C, the softening point must be converted to 85°C before the needle penetration index is measured. If the softening point of the coal digest is below 85°C, the coal digest is distilled in an inert atmosphere or in vacuo to remove lowboiling impurities. If the softening point of the coal digest is above 85°C, oil or tar extender is added to diminish the softening point to 85°C. In each case the distillation or addition is continued until the softening point is 85°C. The value of the needle penetration index of this product, having the 85°C softening point, is the needle penetration index, converted to a softening point of 85°C, of the original coal digest. Any extender employed should desirably be that, if any, to be employed in the cellular material of the present invention If no extender is to be employed in the cellular material, the extender should have an immeasurably large needle penetration index (over 500) under the standard conditions so that is does not contribute substantially to the needle penetration index of the coal digest.

The coal pitch may be further extended by an oil or tar compatible with the coal pitch. In general, suitable oils and tars are formed by the destructive distillation of coal and do not include the relatively volatile "oils" comprising mainly aliphatic hydrocarbons which will generally be found to be incompatible with the coal pitch. Heavy oils, particularly having boiling points in excess of 300°C, are preferred.

The coal pitch when so extended with the oil or tars, will generally have a density at 25°C of between 1175 and 1190 kg/m$^3$, and preferably between 1180 and 1185 kg/m$^3$.

Any epoxide compatible with the coal pitch may in principle be employed in the present invenion. It will however be understood that the properties of the cellular material will vary according to the nature of the epoxy resin. The cellular material, for example, may be rigid or flexible. A flexible epoxy resin will generally be employed in a flexible cellular material. Those of skill in the art of formulation of epoxy resin compositions will be well aware of the kinds of epoxy resins known as flexible epoxy resins. Preferred kinds of flexible epoxy resins inlude those derived from the diglycidyl ethers of long chain aliphatic diols, for example polyalkyleneglycols, in particular polypropyleneglycols, which may have molecular weights up to about 2000, as well as polymethylene diols.

Epoxides other than those of flexible epoxy resins may be employed, if appropriate in addition to those of the flexible epoxy resin. Epoxides that may generally be employed include glycidyl ethers, esters and amines. In particular, the glycidyl ether of bisphenol A and derivatives thereof, which are formed by the reaction of bisphenol A and 1'-chloromethyloxirane, may be employed as the epoxide for the epoxy resin. Other epoxides that may be employed include glycidyl ethers of aliphatic polyols, for example glycerol, and glycidyl esters of aromatic dicarboxylic acids, for example phthalic acid. Epoxidised alkenes and alkadienes, as well as cyclic analogues may be used, for example 3,4-epoxy-6-methylcyclohexylmethyl-3,4-eposxy-6-methylcyclohexanecarboxylate and dicyclopentadiene dioxide.

The epoxy resin is formed by the reaction of an epoxide with a curing agent therefor. The choice of epoxide and curing agent is a matter for those of skill in the art of formulation of epoxy resin compositions. In general the epoxide should have a number average of epoxide rings of at least 1.1 and preferably less than 1.9. Suitable curing agents include amines, amides and anhydrides, including polymeric compounds. Typical curing agents include triethylenetetramine, diethylaminopropylamine, 4,4'diaminodiphenylmethane, phthalic anhydride and hexahydrophthalic anhydride. It may often be advisable to include catalysts or promotors for the curing reaction, which may be phenolic compounds or amines, for example (dimethylaminomethyl)phenol and N-n-butylimidazole.

Any suitable foaming or blowing agent may be employed in order to form the cells in the cellular material, provided that the gaseous or vaporized substance does not dissolve in the coal pitch. Volatile low molecular weight organic substances may, in principle, be employed, but they are particularly subject to the solubility criterion. Examples of such substances include halogenated hydrocarbons, for example chlorinated hydrocarbons, fluorinated hydrocarbons and chlorofluorinated hydrocarbons, as well as hydrocarbons, for example propane and butane. Inorganic gases may, in principle, be employed as foaming or blowing agents, for example nitrogen, carbon dioxide and air. Other foaming or blowing agents include compounds releasing gases on heating, for example azo compounds. Examples of these include sodium bicarbonate, 2,2'-azodiisobutyronitrile, benzenedisulphonhydrazide, di(4-benzenesulphonhydrazide) ether and azodicarbonamide.

A particularly useful group of compounds that react both as curing agents and blowing agents are the organosiloxanes, described in United Kingdon specification No. 1,009,164. These have Si—H bonds which react with hydroxyl groups formed by hydrolysis or other reaction of the epoxide.

The amount of foaming or blowing agent employed will depend on the desired density of the cellular material. Foams including over 60% by volume of small gas or vapour bubbles or voids may often be made.

Surface active agents, for example silicones, may be employed to promote a uniform fine cell structure. Other additives may also be used. For example, reactive diluents and modifiers may often be employed. In each case, careful regard must be had to the desired properties.

It may often be convenient to employ fire retardant substances in the cellular material. Fire retardant substances that may be employed are, in general, those that are used in epoxy resins. Examples of such fire retardant substances include brominated organic compounds and antimony trioxide, the latter generally in conjunction with a further fire retardant substance, for example ammonium fluoroborate, dichlorane and chlorinated waxes.

The ratios of the coal pitch, any extender and the epoxy resin will depend on the desired properties of the cellular material, and on the epoxy resin and the coal tar pitch. It is therefore not possible to indicate the ratios that may be employed for particular purposes. The cellular material may contain as little as 20% of the epoxide resin. It is in general advantageous if it contains less that 60% of coal pitch.

Conveniently, the coal pitch, extended as required, the epoxide and the blowing agent are mixed until foaming commences and the hardener is then added. With compounds releasing a gas or vapour on heating, the mixture is heated to the appropriate temperature and stirred, entraining small amounts of air and forming nuclei around which the cells may form.

If a two part system is employed, the exact method of mixing will depend on the characteristics of the two parts. It is a routine matter to settle a mixing schedule to give the desired result. While the exothermal nature of the reaction requires care to be taken, the use of the coal pitch in accordance with the invention enables cellular materials to be produced which do not need special apparatus. In many cases the constituents may be mixed in a mixing head and spread onto a sheet or conveyor. At last one component of the two-part system may be heated before mixing, or the mixture may itself be heated. This is particularly advisable if the coal pitch, or a portion of the two-part system containing the coal pitch is solid or viscous at ambient temperatures. The invention is particularly applicable to those cases in which the foamable plastics composition is pre-heated to above about 50° before foaming commences and most particularly to those in which the pre-heating temperature is above about 85°C.

The cellular materials of the invention are particularly applicable to sealing gaps or joints in buildings and civil engineering structures, which terms are to be taken as including paving of roadways, airfield runways and the like. Buildings and civil engineering structures are often provided with gaps or joints to allow for thermal or other expansion and contraction. Gaps may also appear in the form of random cracks. It is often necessary to seal such joints or gaps to prevent the passage of water or other liquids through the joint or gap. Gaskets, particularly cellular gaskets, elastomers and mastics are generally used as sealants for gaps or joints.

Particularly in the case of buildings or civil engineering structure consisting mainly of concrete, there may be a relatively large thermal expansion and contraction, compared with the size of the joint. The sealant employed must accommodate this movement while still preventing the passage of water or other liquids through the gap or joint. The sides of the gap or joint are often non-uniform, and the sealant must be bonded securely and uniformly to the sides of the gap or joint over the whole of the length thereof; failure at any one point may allow passage of the water or other liquids. This is particularly a problem for cracks in concrete paving and the like. Gaskets and elastomermic sealants are in general unsuitable for non-uniform gaps or joints. Mastics may be employed, but, for a non-uniform gap or joint, it is often necessary to insert the mastic into the gap or joint in a fluid form, either as an emulsion or as a hot melt. The mastics hitherto so applied have had disadvantages as their properties are such that they may have insufficient flexibility and resiliance, or excessive temperature susceptability or too long a curing time or a lack of resistance to fuel and split chemicals. The latter is a problem in paving applications, particularly for runways and aprons on airfields. While the hot melt mastic compositions that have hitherto generally been employed have fulfilled these conditions to varying extents, there may be considerable delay before it is safe to allow the paving to be used normally, without damage to the sealant.

The cellular materials of the invention are suitable sealants for gaps or joints, with excellent adhesion to the sides of the gaps or joints, and with good flexibility and good fuel resistance. The invention can be employed in such a manner that the sealant will cure rapidly so that paving can be used within a short time of the gap or joint being sealed. The two parts of the foamable two-part system may be mixed and injected into a gap or joint in a building or a civil engineering structure, the mixture foaming within the gap or joint, thereby filling and sealing the joint with the cellular material.

The cellular material may have any desired degree of flexibility according to the nature of the gap or joint. It will be more normal to employ a semi-rigid or a flexible cellular material, which will generally include a flexible epoxide resin.

Having regard to the nature of the materials employed in the building and civil engineering industries, and conditions employed on site, it is often desirable to prime the joint. Suitable primers include epoxy resin primers, and pitch/epoxy resin mixtures may be used.

The size of the gap or joint is not material to the invention. A normal joint for the purposes of thermal expansion and contraction may have a width of the order of 20mm. The invention may also be used to form a flashing, particularly in the case in which boards are employed in a roofing system. It is not convenient to shape boards exactly to the size of a chimney or to conform to the shape of a wall, and a gap, which may be of the order of 200 to 500 mm may be left between the boards and the chimney or wall, to be filled in accordance with this invention.

The following examples are illustrative of the invention, although it will be understood that they may be departed from in order to produce a wide variety of products. The density and flexibility may be varied in accordance, in particular, with the properties of the blowing agent, the epoxide, the curing agent and blowing and curing conditions.

MANUFACTURE OF COAL DIGEST

An oil-extended coal digest was manufactured by digesting coal with a pitch at 300°C at atmospheric pressure, and was then extended with anthracene oil to give a coal digest having a Ring and Ball softening point of 85°C and a needle penetration index of 20. 44 parts of this digest were extended with 30 parts of anthracene oil. This was used in Examples 1, 2 and 4 and is hereafter referred to as oil-extended coal digest.

EXAMPLE 1

The compositions shown in Table 1 below were foamed. In each case the epoxide, the oil-extended coal digest, the blowing agent and the toluene, if used, were heated to 110°C and stirred vigorously until foaming commenced. The curing agent was then stirred in and the mixture allowed to foam and cure.

For compositions 1 to 4 inclusive a glycidyl ether derived from a bisphenol A derivative was employed. For compositions 5 and 6 and 70% of the epoxide was a glycidyl ether of a polypropyleneglycol of molecular weight about 1000, the balance being the same epoxide as was employed in compositions 1 to 4.

TABLE 1

| Composition |   | 1 | 2 | 3 | 4 | 5 | 6 |
|---|---|---|---|---|---|---|---|
| Epoxide | % | 57.0 | 47.0 | 37.0 | 27.0 | 61.2 | 50.5 |
| Oil-extended |  |  |  |  |  |  |  |
| coal digest | % | 30.0 | 40.0 | 50.0 | 60.0 | 32.3 | 43.0 |
| Blowing agent | % | 3.5 | 3.5 | 3.5 | 3.5 | 3.7 | 3.7 |
| Toluene | % | 4.3 | 4.3 | 4.3 | 4.3 | — | — |
| Curing Agent | % | 5.2 | 5.2 | 5.2 | 5.2 | 2.8 | 2.8 |
| Density kg/m³ |  | 100 | 103 | 98 | 100 | 110 | 110 |
| Water absorption | % |  | 2.3 |  |  |  |  |

All compositions had even small closed cells and were strong and water resistant. Compositions 1, 2, 3 and 4 were rigid and had an excellent water absorption (measured as the % by volume absorbed after immersion for 24 hours). Compositions 5 and 6 were of good flexibility, at relatively low density.

EXAMPLE 2

The compositions shown in Table 2 below were foamed analogously to compositions 1 and 4 above. The same epoxide was employed. In such case a rigid relatively more friable cellular material was obtained.

TABLE 2

| Composition | 7 | 8 |
|---|---|---|
| Epoxide | 59 | 32 |
| Triethylene tetramine curing agent | 7 | 4 |
| Coal tar pitch (softening point 80°), nil penetration | 25 | 60 |
| Toluene | 5 |  |
| Azo blowing agent | 4 | 4 |
| Density of product kg/m³ | 180 | 160 |

EXAMPLE 3

A coal digest is manufactured by dissolving coal in anthracene oil at about 350°C. The coal digest has a Ring and Ball softening point of 80°C and penetration converted to a Ring and Ball softening point of 85°C of 18. One part of the coal digest is extended with 0.69 parts of anthracene oil.

72 parts of an epoxide as employed for composition 5, 20 parts including extender of the coal digest, extended as above, 4.4 parts of a polyamide curing agent for the epoxide and 3 parts of an organosiloxane according to specification No. 1,009,164 are mixed at 25°C and poured into a gap so that the mixture occupied one third of the volume of the gap. The epoxide cures and reacts with the blowing agent over a period of 2 hours during which time the cellular material formed occupies substantially the whole of the volume of the gap. The structure in which the gap has been sealed is then able to be used, for example if it were a road, although a full cure of the epoxy resin would take about 3 days.

Suitable organosiloxane compounds containing one or more Si—H linkages are, for example, silanes such as those of formula $R^1R^2R^3Si$—H where $R^1$, $R^2$ and $R^3$ may be the same or different and represent alkyl, alkoxy or aryl groups; cyclic siloxanes such as tetra - alkyl-cyclotetrasiloxanes; and linear di or polysiloxanes such as tetra-alkyldisiloxanes and polysiloxanes containing silicon-bonded organic radicals in addition to the silicon-bonded hydrogen atoms, for example methyl phenyl polysiloxanes, methyl vinyl polysiloxanes and methyl hydrogen polysiloxanes having terminal trimethylsiloxy groups.

EXAMPLE 4

The compositions shown in Table 3 below were foamed. In each case the epoxide, the oil-extended coal digest and the azo blowing agent were mixed and heated to the mixing temperature. The curing agent was then added. The heat produced in the curing reaction raised the temperature of the mixtures to above 140°C at which temperature the blowing agent decomposed, foaming the mixtures.

The mixing temperatures were chosen so as to produce a maximum temperature during the curing reaction of under about 150°C. This was difficult on the case of composition 9, since, if a mixing temperature of less than 85°C was employed, the curing reaction would have been too slow initially to produce a satisfactory cellular material; in practise a temperature of about 170°C was reached. Cellular mixtures were produced which set rapidly to cellular materials having properties as shown in Table 3.

The crushing strengths were measured on a sheet 25 mm thick. The water absorption is the increase in weight of a sample after 7 days complete immersion at ambient temperature. It is to be noted that values quoted may not be consistant with other tests even if they purpose to be expressed identically, as there is considerable variation in test methods.

The cells of the cellular materials were fine and even. The cellular material was tested by contact with water and fuel chemicals and showed little if any deterioration after exposure. This is a valuable feature of the invention, particularly in building and civil engineering uses.

TABLE 3

| Composition | 9 | 10 | 11 | 12 | 13 | 14 | 15 |
|---|---|---|---|---|---|---|---|
| Epoxide parts | 76.7 | 67.8 | 58.9 | 50.0 | 41.1 | 32.1 | 23.0 |
| Oil-extended coal digest parts | 10 | 20.0 | 30.0 | 40.0 | 50.0 | 60.0 | 70.0 |
| Blowing agent parts | 4 | 4.0 | 4.0 | 4.0 | 4.0 | 4.0 | 4.0 |
| Curing agent parts | 9.3 | 8.2 | 7.1 | 6.0 | 4.9 | 3.9 | 3.0 |

TABLE 3-continued

| Composition | 9 | 10 | 11 | 12 | 13 | 14 | 15 |
|---|---|---|---|---|---|---|---|
| Fixing temperature °C | 85 | 110 | 130 | 130 | 135 | 135 | 140 |
| Density kg/m³ | 152 | 223 | 167 | 223 | 187 | 340 | 288 |
| Crushing strength MN/m² | 3.0 | 2.3 | 1.1 | 1.8 | 1.1 | 3.6 | 1.0 |
| Water absorption % | | 2.2 | 2.6 | 2.5 | 2.5 | 1.9 | |
| Tensile strength MN/m² | | | | | 1.3 | | |

COMPARATIVE TEST

An attempt was made to manufacture a cellular material in the absence of coal pitch, with the addition of 5% by weight of toluene, which should act to mitigate the effect of the heat produced by the curing of the epoxy resin. The method quantities and other constituents were otherwise identical with those compositions shown in Table 3. The mixture foamed and cured to a size not dissimilar to those produced in accordance with example 4. When the product was cut open, it was found that the product comprised a single large void surrounded by a very uneven cellular material. This cellular material had relatively few large uneven cells relatively well spaced and having a density of about 1,000 kg/m³. However, the interior of the cellular material had been at such a temperature that the epoxy resin had become scorched, the interior of the void and the bottom of the mould being a black shiny resinous mass. The colour of the resin was lighter towards the outer surface of the cellular mass, at which surface it was white. This was clearly caused by the excessive heat.

We claim:

1. A cellular material consisting of between 5% and 80% of a coal pitch selected from coal tar pitches and coal digests and an epoxy resin, and including at least 25% by volume of cells.

2. The cellular material of claim 1 containing between 10% and 40% of the coal pitch.

3. The cellular material of claim 2 including at least 60% by volume of cells.

4. The cellular material of claim 3 in which the epoxy resin is formed by the reaction of an epoxide with a curing agent for the epoxide, said epoxide being selected from glycidyl ethers of 2,2-bis(4-hydroxyphenyl)-propane, glycidyl ethers formed by the reaction of 2,2-bis(4-hydroxyphenyl)-propane with 1'-chloromethyloxirane, glycidyl ethers of aliphatic polyols, glycidyl esters of aromatic dicarboxylic acids, epoxidized alkenes and alkadienes, 3,4-epoxy-6-methylcylohexylmethyl-3,4-epoxy-6-methylcyclohexylcarboxylate and dicyclopentadiene dioxide.

5. The cellular material of claim 4 in which the epoxide is a glycidyl ether.

6. The cellular material of claim 4 in which the coal pitch is a coal tar pitch.

7. The cellular material of claim 4 in which the coal pitch is a coal digest formed by the dissolution of coal in pitch, tar or tar oil at between about 300°C and about 450°C.

8. The cellular material of claim 7 in which the coal pitch is a coal digest which has a penetration, converted to a Ring and Ball softening point of 85°C, of at least 10.

9. The cellular material of claim 4 in which at least a portion of the epoxy resin is a flexible epoxy resin.

10. A method for the manufacture of the cellular material of claim 1 comprising mixing an epoxide having a number average of at least 1.1 epoxide rings per molecule, a curing agent for said epoxide, a blowing agent, and between 5% and 80% of a coal pitch selected from coal tar pitch and coal digests to form a mixture, whereby the epoxide reacts with the curing agent to cure the epoxide and, concurrently, the blowing agent forms cells in the mixture.

11. A two-part system, for the manufacture of the cellular material of claim 1, consisting of an epoxide, a curing agent for the epoxide, a blowing agent and between 5% and 80% of a coal pitch selected from coal tar pitch and coal digests, in which the first part contains the epoxide and the second part contains the curing agent.

12. In a method of manufacturing a cellular material in which a mixture containing an epoxide and a curing agent reactable with the epoxide to form an epoxy resin, is blown or foamed concurrently with the reaction of the epoxide with the curing agent so that a cellular material is formed, the improvement wherein the mixture contains between 5% and 80% of a coal pitch selected from coal tar pitches and coal digests.

13. The method of claim 12 in which the epoxide is a glycidyl ether.

14. The method of claim 13 in which the glycidyl ether is selected from the diglycidyl ether of 2,2-bis(4-hydroxyphenyl)-propane, glycidyl ethers formed by the reaction of 2,2-bis(4-hydroxyphenyl)-propane with 1'-chloromethyloxirane, and glycidyl ethers of aliphatic polyols.

15. The method of claim 14 in which the glycidyl ether of the aliphatic polyol is selected from the diglycidyl ethers of the poly-(alkyleneglycols) and the diglycidyl ethers of the polymethylene diols.

16. The method of claim 14 in which the coal pitch is coal tar pitch.

17. The method of claim 14 in which the coal pitch is coal digest.

18. The method of claim 14 in which the mixture is injected into a joint or gap in a building or civil engineering structure whereby, without additional heating subsequent to the injection, the cellular material is formed in, and thereby fills and seals, the joint of gap.

19. The method of claim 12 in which the mixture contains an organosiloxane, the organosiloxane reacting as both the curing agent and the blowing agent.

20. The method of claim 19 in which the epoxide forms a flexible epoxy resin and the coal pitch is a coal digest having a penetration, converted to a Ring and Ball softening point of 85°C, of at least 10.

21. The method of claim 20 in which the mixture is injected into a joint or gap in a building or civil engineering structure whereby, without additional heating, the blowing agent forms cells and the epoxide reacts with the curing agent in the joint or gap, filling and sealing the joint or gap.

22. The method of claim 20 in which the mixture is injected into a joint or gap in building or civil engineering structure whereby, without additional heating subsequent to the injection, the cellular material is formed in, and thereby fills and seals, the joint or gap.

23. The method of claim 12 in which the mixture is pre-heated to a temperature of above about 50°C before foaming commences.

24. The method of claim 23 in which at least 20% of the mixture is epoxide.

25. The method of claim 24 in which the coal pitch is coal tar pitch.

26. The method of claim 12 in which the mixture is blown or foamed by means of a blowing agent, said blowing agent comprising one or more compounds releasing gas on heating.

27. The method of claim 26 in which the release of the gas by the blowing agent is caused by the reaction of the curing agent with the epoxide.

28. The method of claim 27 in which the curing agent is an organosiloxane.

29. The method of claim 26 in which the epoxide is selected from glycidyl ethers of 2,2-bis(4-hydroxyphenyl)-propane, glycidyl ethers formed by the reaction of 2,2-bis(4-hydroxyphenyl)-propane with 1'-chloromethyloxirane, glycidyl ethers of aliphatic polyols, glycidyl esters of aromatic dicarboxylic acids, epoxidized alkenes and alkadienes, 3,4-epoxy-6-methylcyclohexylmethyl-3,4-epoxy-6-methycyclohexylcarboxylate and dicyclopentadiene dioxide.

30. The method of claim 29 in which the coal pitch is a coal tar pitch.

31. The method of claim 29 in which the coal pitch is a coal digest.

32. A two-part system comprising the constituents of the mixture used in the method of claim 12, including a blowing agent, in which the first part contains the epoxide and the second part contains the curing agent.

33. The two-part system of claim 32 in which the second part contains the coal pitch.

34. The two-part system of claim 33 containing between 10% and 40% of the coal pitch.

35. The two-part system of claim 34 containing at least 20% of the epoxide.

36. The two-part system of claim 33 in which blowing agent comprises one or more compounds releasing gas on heating.

37. The two-part system of claim 36 in which the epoxide is selected from glycidyl ethers of 2,2-bis(4-hydroxyphenyl)-propane, glycidyl ethers produced by the reaction of 2,2-bis(4-hydroxyphenyl)-propane with 1'-chloromethyloxirane, glycidyl ethers of aliphatic polyols, glycidyl esters of aromatic dicarboxylic acids, epoxidized alkenes and alkadienes, 3,4-epoxy-6-methylcyclohexylmethyl-3,4-epoxy-6-methylcyclohexylcarboxylate, and dicyclopentadiene dioxide.

38. The two-part system of claim 33 in which the epoxide is a glycidyl ether.

39. The two-part system of claim 38 in which the glycidyl ether is selected from the diglycidyl ether of 2,2-bis(4-hydroxyphenyl)-propane, glycidyl ethers formed by the reaction of 2,2-bis(4-hydroxyphenyl)-propane with 1'-chloromethyloxirane, and glycidyl ethers of aliphatic polyols.

40. The two-part system of claim 39 in which the aliphatic polyol is selected from the diglycidyl ethers of the poly(alkyleneglycols) and the diglycidyl ethers of the polymethylene diols.

* * * * *